July 20, 1965  W. B. McCARDELL  3,195,239
GEAR TOOTH CHECKING SYSTEM
Filed May 1, 1961  3 Sheets-Sheet 3
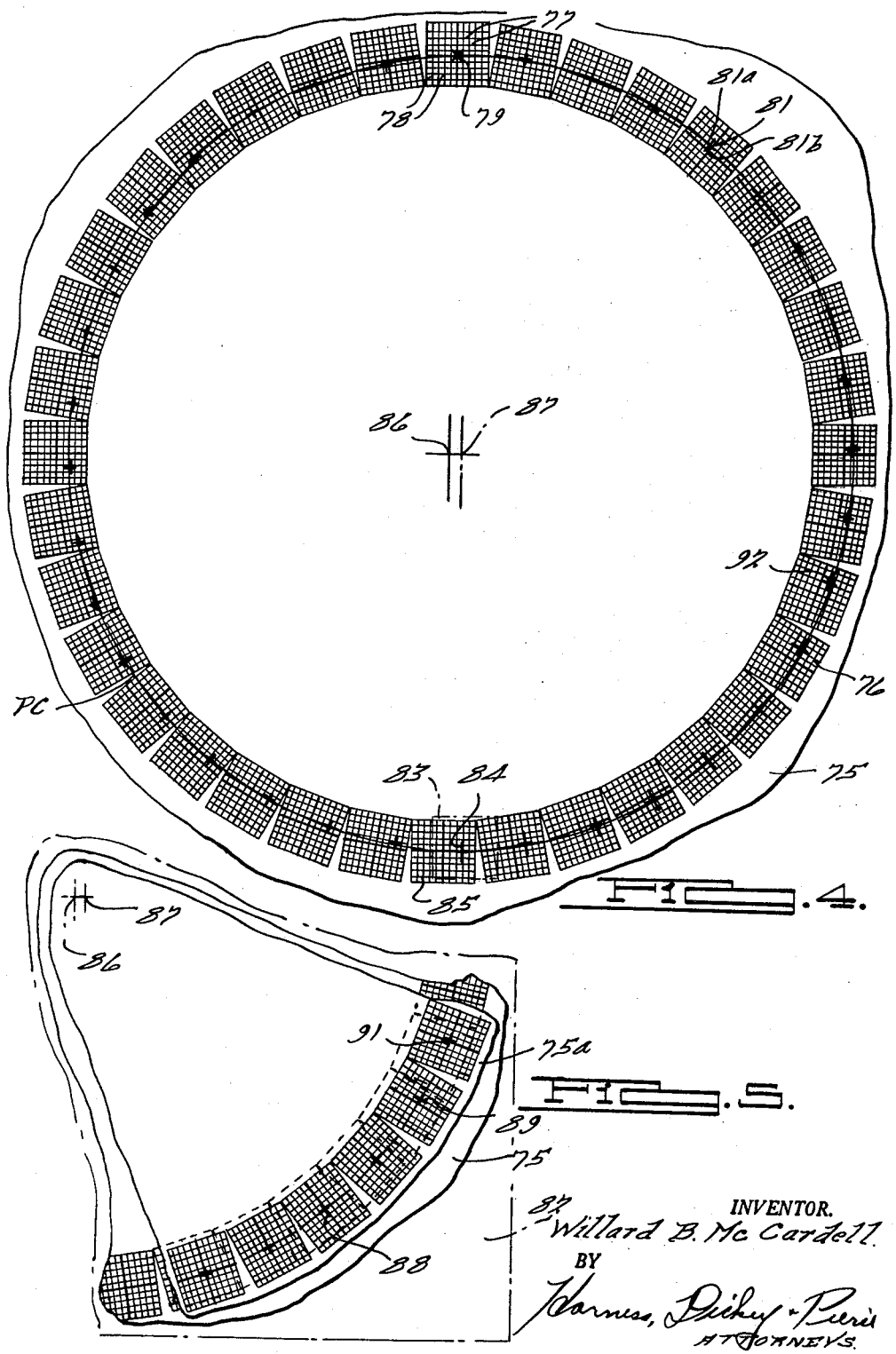
INVENTOR.
Willard B. McCardell
BY
Harness, Dickey & Pierce
ATTORNEYS.

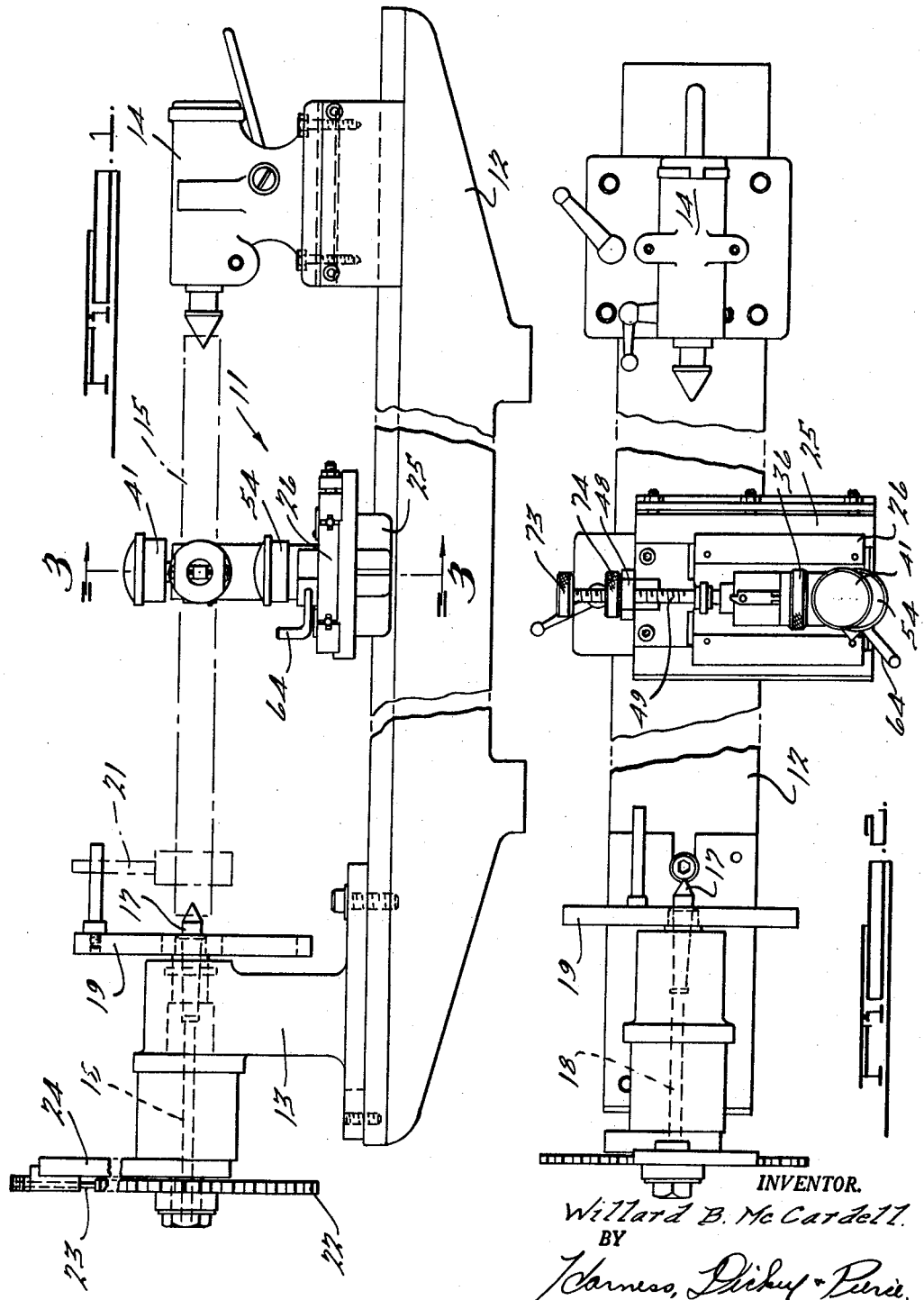

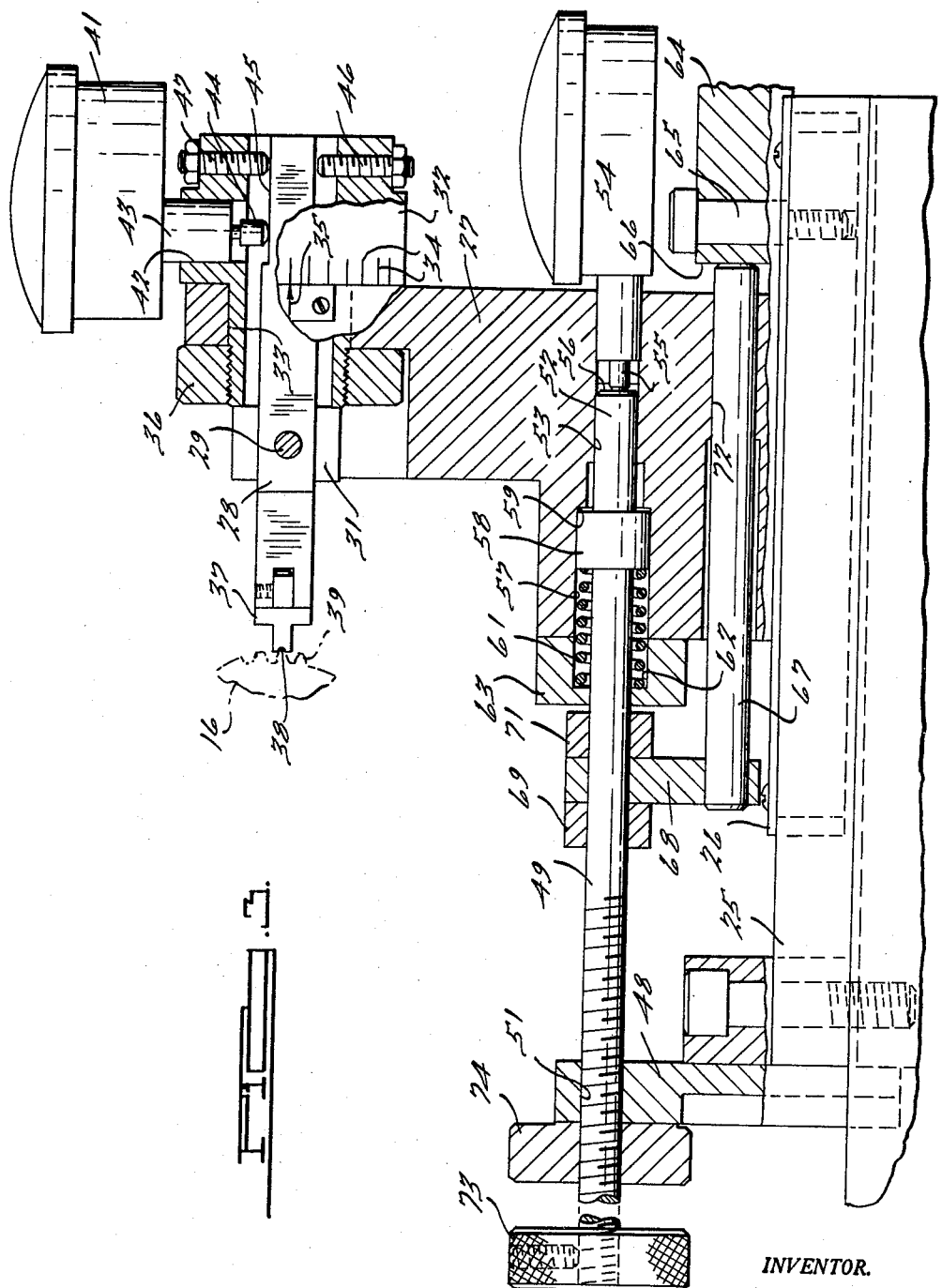

United States Patent Office 3,195,239
Patented July 20, 1965

3,195,239
GEAR TOOTH CHECKING SYSTEM
Willard B. McCardell, Royal Oak, Mich., assignor to Michigan Tool Company, Detroit, Mich., a corporation of Delaware
Filed May 1, 1961, Ser. No. 106,645
9 Claims. (Cl. 33—179.5)

This invention relates to gear tooth checking systems, and more particularly to a method and apparatus for determining the pitch circle eccentricity as well as the tooth spacing errors on straight or helical gears and splines.

The problem of checking the accuracy of gears and splines is complicated by the fact that two types of errors, pitch circle eccentricity or runout, and tooth spacing or index errors between teeth, cannot be separated or differentiated by ordinary checking methods except perhaps by the use of lengthy and complicated mathematical analysis.

It is an object of the present invention to provide a novel and improved gear checking system which will quickly identify tooth errors and will permit the separation of index and eccentricity errors by simple means without the necessity for analysis by a highly trained person.

It is another object to provide an improved checking system of this character which is versatile in nature, may be applied to straight or helical gears and splines, is usable for even or odd numbers of teeth, and requires relatively uncomplicated equipment.

Other objects and advantages of the present invention will become apparent from the following detailed description taken in conjunction with the accompanying drawings.

In the drawings:

FIGURE 1 is a front elevational view of a checker used to obtain readings as part of the novel tooth checking system;

FIGURE 2 is a top plan view of the checker;

FIGURE 3 is a side elevational view in cross section of the pointer slide, carriage and associated parts taken along the line 3—3 of FIGURE 1;

FIGURE 4 shows a chart used to plot the readings taken on the checker; and

FIGURE 5 shows a portion of a second chart overlying the first chart on a light table in order to plot the pitch circle eccentricity as well as the true tooth spacing or index errors of the individual gear teeth.

In general terms, the illustrated embodiment of the invention comprises a checker in which a gear may be mounted between centers, the checker having a pointer carriage with two dial indicators, and a pointer tip engageable with one tooth at a time. One indicator shows the radial distance of the pointer from the checker centerline for each tooth, while the other indicator shows the position of the tooth in a circumferential or angular direction. The latter is accomplished by forming the pointer as a pivotable lever which moves the second indicator, the pointer engaging both flanks of each tooth.

A plurality of charts are provided for plotting the indicator readings, each chart having a plurality of plotting areas arranged in a circle, each area representing one tooth and having rectangular coordinates. In plotting the readings on the first of these charts, a fiducial tooth is chosen having approximately zero runout or eccentricity. The readings are plotted in each tooth area on the chart by drawing a tangential line corresponding to the radial indicator reading and a radial line corresponding to the reading of tip pivotal movement.

The chart is then placed on a light table and a second blank chart placed over it so that the zero coordinates of the fiducial tooth areas on the two charts match. The second chart is then swung about this point until the origins of its tooth areas (which are on the gear pitch circle of the second chart) coincide with the pitch circle of the first chart (which is a circle passing through the plotted points). The plotted points of the other teeth on the first chart are then traced onto the second chart, and the center of the first chart is also traced onto the second chart. The spacing between the plotted center and actual center on the second chart will then show the amount of pitch circle eccentricity, while the plotted radial lines on the second chart will show the true tooth spacing or index area of each tooth with respect to the fiducial tooth, with the eccentricity error being removed.

Referring more particularly to the drawings, the checker is generally indicated at 11 and comprises a bed 12 having a headstock 13 at one end and a tailstock 14 at the other end thereof. The tailstock is preferably movable toward and away from the headstock to accommodate different sizes of shafts 15 carrying gears 16 (FIGURE 3) which it is desired to check.

Headstock 13 carries a center 17 connected with a shaft 18 rotatably mounted in the headstock. A plate 19 may be secured to shaft 18 for providing a driving connection with shaft 15 through connecting means shown in dot-dash lines at 21. An index plate 22 is detachably mounted on the outer end of shaft 18 and is cooperable with plunger 23 carried by a post 24 secured to the headstock. Index plate 22 may be selected to correspond with the number of teeth on gear 16, so that the gear may be indexed one tooth or a multiple number of teeth at a time by retracting plunger 23 and rotating plate 22.

Transversely extending ways 25 are mounted at an intermediate portion of bed 12 and carry a cross slide 26. A pointer carriage 27 is mounted on slide 26 and extends upwardly therefrom as seen in FIGURE 3. A pointer in the form of a pivot arm 28 is mounted on a horizontal pivot pin 29. Pivot arm 28 and pin 29 are disposed within a central recess 31 extending through a pointer support 32, this support being rotatably mounted in a bearing 33 at the upper end of carriage 27 for angular adjustment on a horizontal axis.

A scale 34 and a zero mark 35 are provided on support 32 and carriage 27 respectively for selecting the angular adjustment of support 32, and a lock nut 36 is threadably mounted on the inner end of support 32 for locking the support in its angularly adjusted position. For checking spur gears, support 32 will be set in its zero position as shown in FIGURE 3, so that the axis of pin 29 will be horizontal. For helical gears, support 32 may be rotatably adjusted to position the axis of pin 29 at the helix angle. A pointer tip 37 is removably mounted on the inner end of pivot arm 28, this tip having a notch 38 engageable with both flanks of an individual tooth 39 of gear 16. Interchangeable pointer tips 37 of different shapes and sizes may be provided for different shapes of teeth or for checking tooth spaces.

A pivot indicator 41 is carried by pointer support 32, a recess 42 being provided in the upper portion of the support for receiving a post 43 extending from the indicator casing. A plunger 44 extends from indicator 41 toward pivot arm 28, plunger 44 engaging a surface 45 on the pivot arm at a point spaced from the axis of pin 29 a distance equal to the distance of notch 38 from the pin axis. Indicator 41 will thus accurately indicate the position of pointer tip 37 as it engages each tooth. A pair of safety stops 46 and 47 are provided on opposite sides of pivot arm 28 outwardly of plunger 44.

A post 48 is secured to the inner end of ways 25 and extends upwardly therefrom, a rod 49 being threadably mounted in an aperture 51 at the upper end of post 48 and extending toward carriage 27. The outer end 52 of rod 49 is slidably mounted in a bore 53 within carriage 27, and a slide position indicator 54 is secured within the outer end of bore 53 by means of a post extending from the indicator casing. Plunger 55 of indicator 54 is engageable with the inner end 56 of rod 49 when the slide and carriage are in their operative position as shown in Figure 3. An enlarged bore 57 is contiguous with bore 53, and a safety stop 58 on rod 49 is slidably disposed within bore 57. Stop 58 is engageable by a shoulder 59 at one end of bore 57 to prevent leftward movement of carriage 27 in FIGURE 3 which might cause damage to indicator 54. A helical compression spring 61 is disposed within bore 57, one end of the spring engaging stop 58 while the other end engages the end of a bore 62 within an extension 63 of carriage 27. Spring 61 urges the carriage to the left in FIGURE 3 so that pointer tip 37 will be urged against gear 16.

Means are provided for shifting carriage 27 and slide 26 between retracted and operative positions, this means including a handle 64 pivotally mounted by a pin 65 to the outer end of slide 26. Handle 64 carries a cam surface 66 engageable with a rod 67 which is secured to and extends in parallel relation with rod 49. More particularly, a bracket 68 is rotatably but non-slidably mounted on rod 49 by means of members 69 and 71 secured to rod 49 on opposite sides of bracket 68. Rod 67 is secured to the lower end of bracket 68 and extends through a bore 72 in the lower portion of carriage 27. Since rod 67 is stationary once rod 49 is adjusted, cam 66 may be so shaped as to cause rightward shifting of slide 26 and carriage 27 in FIGURE 3 when handle 64 is swung about pivot 65. A handle 73 and a lock nut 74 are provided for adjusting the position of rod 49 in accordance with the diameter of the gear being checked.

In operation of checker 11, shaft 15 carrying gear 16 will be mounted between headstock 13 and tailstock 14, and an index plate 22 will be chosen having a number of notches equal to or a multiple of the number of teeth on the gear to be checked. Shaft 15 will be locked to index plate 22 by members 19 and 21 so that each time index plate 22 is rotated one notch, or group of notches, gear 16 will be rotated the theoretically exact angular distance or circular pitch between two adjacent teeth.

To take a reading on any particular tooth, assuming that pointer support 32 is rotated to an angle corresponding with the helix angle of the teeth, handle 64 will be pivoted to permit spring 61 to move carriage 27 to the left in FIGURE 3 until it reaches the position shown in that figure, with pointer tip notch 38 engaging a tooth 39. Indicator 41 will then show the relative angular position of pivot arm 28 on the axis of pin 29. Indicator 54 will show the relative transverse position of carriage 27. In other words, indicator 41 will give a relative measure of the tooth position in a direction at right angles to the extent of the tooth, while indicator 54 will show the relative radial distance of the tooth from the checker centerline. Handle 54 may then be swung to retract carriage 27 to the right in FIGURE 3, so that pointer tip 27 will be withdrawn from gear 16 and the latter may be indexed to the next tooth.

In using the checker to obtain data enabling the determination of tooth spacing errors and eccentricity, a plurality of charts 75, 75a are provided as shown in FIGURES 4 and 5. These are identical charts printed on translucent paper and each comprises a circularly arranged group of squares 76, each square having rectangular coordinates with equally spaced tangential lines 77 and equally spaced lines 78 at right angles to lines 77. The central lines of sets 77 and 78 may be made slightly heavier to serve as "0" lines, the intersection of these central lines being the origin of the coordinate system. A number of squares 76 may be provided which is sufficient to enable each square to be used for plotting the data from a single tooth. If the number of teeth on the gear being checked is only a fraction of the number of squares on the chart, appropriately spaced squares may be used on the chart so that the plotted data will be evenly spaced around the circle. Variations in the chart may be provided within the principles of the invention; for example, a plurality of concentric circles, each with a different number of coordinate squares, may be provided on the same chart, with that circle being chosen which suits the particular gear being checked.

In checking a gear, the operator will first make a preliminary inspection of gear 16, locating two oppositely disposed teeth which give about the same reading on lower indicator 54. These two teeth are located at about the points of zero runout or pitch circle eccentricity, and one of the two teeth will be used as a fiducial tooth, that is, as the starting point of the readings.

The operator will engage pointer tip 37 with the fiducial tooth and set both indicators at zero. He will then record a small "X" at the origin of the graph segment 76 at the top of the chart which represents the first or fiducial tooth; this "X" is indicated at 79 in FIGURE 4.

The operator will then withdraw the pointer, index gear 16 one tooth, and take a reading on the next tooth. Indexing will normally be done in a direction such that the top of index plate 22 moves away from the operator and the plots will be made clockwise from the top segment 76. The resulting graph will thus show data for teeth arranged as if the operator were looking at the teeth from the left hand end of the checker as seen in FIGURE 1.

In checking the teeth, the readings on indicator 54 will be plotted on lines 77 while the readings on indicator 41 will be plotted on lines 78. The number and closeness of the lines may be chosen to suit requirements, the spacing between two adjacent lines may, for example, represent a distance of 0.0002 inch.

If indicator 54 shows that a particular tooth 39 is high with respect to the fiducial tooth, such a reading will be plotted on a line 78 spaced further away from the chart axis than the origin. For example, the plotted mark indicated generally at 81 in FIGURE 4 shows this condition, with the line 81a thereof representing a reading on indicator 54 which shows that this particular tooth is further away from the checker centerline than the fiducial tooth.

Pivot indicator 41 will be responsive to slight shifts of pointer tip 37 about the pointer axis. The data from this indicator may be so plotted that if, for any tooth, pointer tip 37 must be moved clockwise in FIGURE 3 with respect to its position for the fiducial tooth, the reading will be plotted to the left of the origin if one is observing the graph segment from the graph axis. For example, plot 81 has a line 81b to the left of the origin indicating this condition.

After all the tooth positions have been plotted, a second chart 75a is laid over chart 75, as seen in FIGURE 5, both charts being placed on a light table 82. An "X" is made in the top graph segment (not shown) of chart 75a at the origin thereof, and this "X" is placed over the "X" of chart 75. Chart 75a is then swung about this point until the origins of all the graph segments of chart 75a (which may be considered to be on the pitch circle of chart 75a) are over the gear pitch circle PC on chart 75 (FIGURE 4), which is a circle passing through all the plotted points on chart 75. Note that when this is done, the origin of the lowermost graph segment on chart 75a (indicated by dot-dash lines at 83 in FIGURE 4) will not necessarily be positioned over the plotted point 84 of the lowermost graph segment 85 on chart 75. All the plotted points for the teeth are then traced from chart 75 onto chart 75a, and the location of the center of the original chart is also marked on chart 75a.

The errors in the gear or spline may now be analyzed by studying chart 75a. The distance between center 86 of chart 75 and center 87 of chart 75a will indicate the amount of eccentricity, that is, the distance between the axis of the spline or gear and the axis of its shaft. Thus, it will be known whether machine centers are causing excessive runout and whether repairs are necessary. The direction of this eccentricity will also be observable from the plotted information; in the illustrated example, the gear axis will be to the right of the shaft axis.

The points plotted on graph 75a will all be on zero line 77, as is evident in FIGURE 5, eccentricity errors having been removed by shifting the charts in the manner described above. The resulting locations of the plotted points on chart 75a will show the true tooth spacing error for each tooth. For example, point 88 in FIGURE 5 will show a slight tooth spacing error with respect to the fiducial tooth in one direction, whereas point 89 will show a tooth spacing error in the opposite direction. Note that plotted point 91 on chart 75a, which is taken from point 92 on chart 75, seen in FIGURE 4, will actually have practically no true tooth spacing error, whereas point 92 indicated a substantial apparent tooth spacing error.

An apparatus and method are thus provided which may be carried out in a mechanical manner without the necessity of applying mathematical formulae or complicated procedures in order to ascertain true tooth spacing errors and actual gear eccentricity. The charts may be readily preserved as records of the check, occupying a minimum of space, and may be marked to identify the checked gear.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. In a gear tooth checking apparatus, means for supporting a gear for rotation on a predetermined axis, means for successively indexing said gear an angular distance equivalent to the theoretical circular pitch, a pointer carriage movable at right angles to said axis, a pointer mounted on said carriage and adapted to simultaneously engage opposite tooth flanks of only a single tooth, a first indicator responsive to movement of the carriage from a retracted position to an operative position in which said pointer engages a tooth for indicating the radial distance of said pointer from said axis, and a second indicator responsive to engagement of said pointer with a gear tooth for indicating the relative position of the pointer in a direction at right angles to the extent of the engaged tooth.

2. The combination according to claim 1, said first indicator being mounted on said carriage, a stationary stop, and a plunger in said first indicator engageable with said stop when the carriage is moved to its operative position.

3. The combination according to claim 1, said second indicator being mounted on said carriage, a pivotal support for said pointer, a tooth-engageable tip on one side of the pointer axis, and an indicator-engageable surface on the opposite side of the pointer axis.

4. The combination according to claim 3, further provided with a pointer support mounted on said carriage for rotation on an axis at right angles to said predetermined axis, said pivotally mounted pointer being carried by said support with the pointer pivot being at right angles to the support pivot axis, said indicator being mounted on said support for rotation with the pointer about said support pivot axis.

5. The combination according to claim 4, said pointer being provided with a replaceable pointer tip, the outer end of said tip and said indicator-engageable surface being equally spaced from the pointer axis.

6. In a device for checking gear tooth errors, a headstock and a tailstock for supporting a gear therebetween on a predetermined axis, an index plate removably mounted on the headstock, means for connecting the gear and index plate for simultaneous rotation, a carriage movable at right angles to said axis between the headstock and tailstock, a pointer having a tip simultaneously engageable with both sides of only a single gear tooth, means for pivotally supporting said pointer on said carriage, an indicator responsive to engagement of said pointer with a tooth for indicating the relative angular position of the pointer on its pivot axis, a rod extending at right angles to said axis, means for adjusting said rod in an axial direction and securing the rod in fixed position, and a second indicator carried by said carriage and engageable with said rod when said pointer tip engages a tooth to indicate the relative radial distance of the pointer tip from said gear support axis.

7. The combination according to claim 6, said carriage being further provided with a bore within which a portion of said rod is disposed, spaced shoulders on said rod and carriage within said bore, and a compression spring disposed between said shoulders and urging the slide toward said gear support axis.

8. The combination according to claim 7, further provided with a second rod rotatably but non-slidably secured to said first rod and extending parallel to said first rod, a cam pivotally connected to said carriage and engageable with said second rod, and a handle on said cam for swinging the cam, said cam being so shaped as to move said carriage between a retracted position and an operative position when swung by said handle.

9. The combination according to claim 7, further provided with a second pair of shoulders on said rod and carriage respectively within said bore, said second pair of shoulders being engageable to limit radially inward movement of said carriage.

References Cited by the Examiner
UNITED STATES PATENTS

| | | | |
|---|---|---|---|
| 1,642,077 | 9/27 | McIntosh | 33—179.5 |
| 2,307,131 | 1/43 | Holt | 33—1 |
| 2,367,004 | 1/45 | Chitwood | 33—179.5 |
| 2,407,893 | 9/46 | Meyer | 33—1 |
| 2,485,674 | 10/49 | Suiter | 33—1 |
| 2,810,965 | 10/57 | Beam et al. | 33—179.52 |
| 2,819,532 | 1/58 | Praeg | 33—179.52 |
| 3,101,547 | 8/63 | Westphal | 33—1 |

ISAAC LISANN, *Primary Examiner.*

ROBERT L. EVANS, *Examiner.*

UNITED STATES PATENT OFFICE
CERTIFICATE OF CORRECTION

Patent No. 3,195,239

July 20, 1965

Willard B. McCardell

It is hereby certified that error appears in the above numbered patent requiring correction and that the said Letters Patent should read as corrected below.

Column 6, line 5, for the claim reference numeral "4" read -- 3 --.

Signed and sealed this 8th day of February 1966.

(SEAL)
Attest:

ERNEST W. SWIDER
Attesting Officer

EDWARD J. BRENNER
Commissioner of Patents